United States Patent
Barritz (12)

(10) Patent No.: US 7,386,490 B2
(45) Date of Patent: Jun. 10, 2008

(54) AUTOMATED RETAIL WEBSITE CREATION

(75) Inventor: Robert Barritz, New York, NY (US)

(73) Assignee: Treetop Ventures, LLC, Syosset, NY (US)

( * ) Notice: Subject to any disclaimer, the term of this patent is extended or adjusted under 35 U.S.C. 154(b) by 1006 days.

(21) Appl. No.: 09/829,894

(22) Filed: Apr. 10, 2001

(65) Prior Publication Data

US 2001/0037258 A1   Nov. 1, 2001

Related U.S. Application Data

(60) Provisional application No. 60/196,043, filed on Apr. 10, 2000.

(51) Int. Cl.
*G06F 17/30* (2006.01)
(52) U.S. Cl. .................. 705/27; 705/26; 715/825; 715/962
(58) Field of Classification Search .......... 705/26, 705/27, 80; 715/825, 962
See application file for complete search history.

(56) References Cited

U.S. PATENT DOCUMENTS 6,119,101 A * 9/2000 Peckover ............... 705/26
6,332,135 B1 * 12/2001 Conklin et al. .......... 705/80
6,629,135 B1 * 9/2003 Ross et al. ............... 709/218
6,684,369 B1 * 1/2004 Bernardo et al. ......... 715/513

OTHER PUBLICATIONS

Storefrontpro.com web pages captured via the WayBackMachine (archieve.org).*
Storefrontpro.com web pages captured via the WayBackMachine (archieve.org) and dated Feb. 7, 2000.*
"Build the e-commerce catalog"; Saroja Girishankar; Information Week; Nov. 29, 1999.*
"Pinacor's Ecworksite 2.0 Receives Rave Reviews—eCatalog Now Available; PRNewswire; Apr 26, 1999".*

* cited by examiner

*Primary Examiner*—Mark Fadok
(74) *Attorney, Agent, or Firm*—Ostrolenk, Faber, Gerb & Soffen, LLP

(57) ABSTRACT

A website constructing tool for retailers streamlines and substantially automates the task of creating a website for retailers that buy their merchandise from a plurality of vendors. The system avoids the laborious, painstaking, unstructured and unformatted approach to the creation of a retailer website by enabling a retailer website to be constructed by resetting certain criteria and formats for the graphic design and merchandise categories and selection. Thereafter, the system enables substantially automatic selection of the relevant merchandise information from the databases or websites of the vendors, in a manner which populates and inserts into the retailer website the relevant information about available merchandise meeting the criteria, format and organization of the retailer website.

13 Claims, 4 Drawing Sheets

Purchasing Selection Wizard by Category

Purchasing Selection Wizard by Manufacturer

Figure 3 – Selecting an Established Profile

AUTOMATED RETAIL WEBSITE CREATION

RELATED APPLICATION

This Application claims priority and is entitled to the filing date of U.S. Provisional Application Ser. No. 60/196,043, filed Apr. 10, 2000, and entitled "AUTOMATED RETAIL WEBSITE CREATION", the contents of which are incorporated by reference herein.

BACKGROUND OF THE INVENTION

The present invention generally relates to an Internet Website and more particularly to an automated process for creating an Internet based, retail outlet website.

Setting up and operating a conventional retail store involves a number of steps including: finding a location, designing the look and layout of the store; placement of merchandise; order, receive and track a changing inventory; conduct sales and manufacturer promotions; etc.

It comes as little surprise that the steps of setting up a website and operating an on-line retail store involve steps that are directly analogous. These steps involve establishing the look and feel of the site; navigation; deciding on the overall organization and structure of the website into which merchandise will be placed; creation of merchandise descriptions, price schedules, display images, etc.; conduct sales and manufacturer promotions. For example, a retail clothing website could choose to carry all types of clothing, as do conventional department stores, or it could specialize in men's clothing, or big and tall clothing, or resort wear, or formal wear, or just shirts. Websites selling hardware items could choose to cater only to the needs of woodworkers, or machinists, or woodcarvers. The website proprietor must also decide on the way the merchandise is to be organized, for example, shirts, pants, and outerwear each in a separate "department", or all merchandise from a particular manufacturer (Perry Ellis, Ralph Lauren) together in a "boutique." And the website proprietor must decide on the general appearance of the website—the graphic design elements, such as images, typography and layout.

Finally, having decided on the scope of merchandise, and settling on the website organization and appearance, the website proprietor must select merchandise from one or more vendors that matches the chosen merchandise profile (for example, men's resort wear, in big and tall sizes only) must then download or otherwise acquire the vendor's pricing and descriptive and marketing information for each selected item, and must use this information to create web pages with the desired organization and appearance.

At the same time, it is apparent that the retailer is investing a considerable effort to create product descriptions and the like of his inventory when most, if not all, of this information is already in machine readable form on the vendor's computer.

This process is duplicative, tedious, time-consuming, and prone to error. Even an established site will experience these difficulties when major changes are required, such as the changeover from spring to summer fashions, or adding or deleting the merchandise of a particular vendor, or of a particular type. Today's e-commerce sites, e.g. Econgo.com, BigStep.com, etc., that promote the creation of retail websites do not overcome these problems.

At the same time, many vendors are already maintaining or are planning to maintain on-line databases or computer-readable catalogs (CD-ROM, download, etc.) of product information. As used here, "vendor" denotes a manufacturer, distributor, reseller, etc. Typical information includes:
- Product code, UPC code, SKU or other such identifying code;
- Description, retail price, etc.
- Styles, color, size, etc.;
- Ordering information—price, delivery, terms, etc.; and,
- Incentive Programs for the retailer and/or consumer.

These databases also provide the following:
- Marketing material—brochures, ad layouts, etc.;
- Digital images of the items in one or more sizes and formats;
- Hyperlink to an on-line catalog, promotion, etc.; and
- Tags that describe the product, uses, etc.

A convenient way for vendors to make data available is through the use of Extensible Markup Language (XML). While HTML allows the definition and specification of layout and appearance, XML allows for the definition and specification of the kind of underlying data described above, using sets of industry-specific tags. For example, XML for the apparel industry might provide a tag identifying the type of garment ("shirt", "pants"), another identifying the color, another the size, another a reproducible image of the item, and so on. But, while use of XML provides a common language that vendors can use to describe their products and associated material, it will still be laborious for Internet retailers to use this information to construct or populate their websites. It is desirable to provide a tool that facilitates and streamlines the creation by retailers of websites through which they can market a wide range of goods and services.

SUMMARY OF THE INVENTION

It is an object of the present invention to provide a streamlined and easy to use tool for the creation of websites by and for retailers.

It is another object of the present invention to provide a website constructing tool which enables the creation of retailer websites in a largely automated and structured manner.

It is yet another object of the invention to provide a website construction tool for retailers which not only creates the website, but also allows its easy modification and updating.

The foregoing and other objects of the invention are realized by a website construction tool which enables individuals, not necessarily steeped in computer and website creation, to follow a prescribed menu of steps that allows the creation of websites. The tool has several main constituents that achieve the purposes of the invention, including a subsystem through which a user can select and set the criteria for the type of merchandise to be stocked. A second subsystem deals with the organization of the website and has a further component which sets the overall graphic design of the website. A further subsystem allows the website constructor to choose the actual merchandise by type, quantity and other merchandise parameters. A still further subsystem automatically scans the Internet or contacts predefined suppliers, manufacturers, or vendors to download detailed information about the merchandise that has been chosen. The last subsystem is responsible for actually building the website, as well as rebuilding the website from time to time, to account for changing merchandise or to accommodate other seasonal variants that affect the maintenance of the website.

Other features and advantages of the present invention will become apparent from the following description of the invention which refers to the accompanying drawings.

DETAILED DESCRIPTION OF THE INVENTION

The present invention overcomes many of the prior art problems by providing a method of creating retail websites in a semi-automated and/or substantially automated fashion.

In accordance with a preferred embodiment, a tool known as the Website Constructor (WC) allows an Internet-based retailer to perform the following functions in a semi-automated fashion:

1. Establish Selection Criteria for Merchandise to be Stocked

Through the use of a software wizard, menu, context-sensitive menu or other mechanism, the user is able to establish criteria for merchandise selection. Such criteria can be one or more of the following:

Category (Women's dresses, electronics, automotive, etc.);
Sub-category (casual wear, formal wear, petite, etc.);
Manufacturer (Calvin Klein, DKNY, etc.);
Vendor (distributor, reseller, manufacturer);
Promotions, close-outs, etc.;
The starting date (based upon seasonal changeover, delivery schedules, sales, etc.); and,
The ending date (of sales, seasons, etc.)

Figure 1:
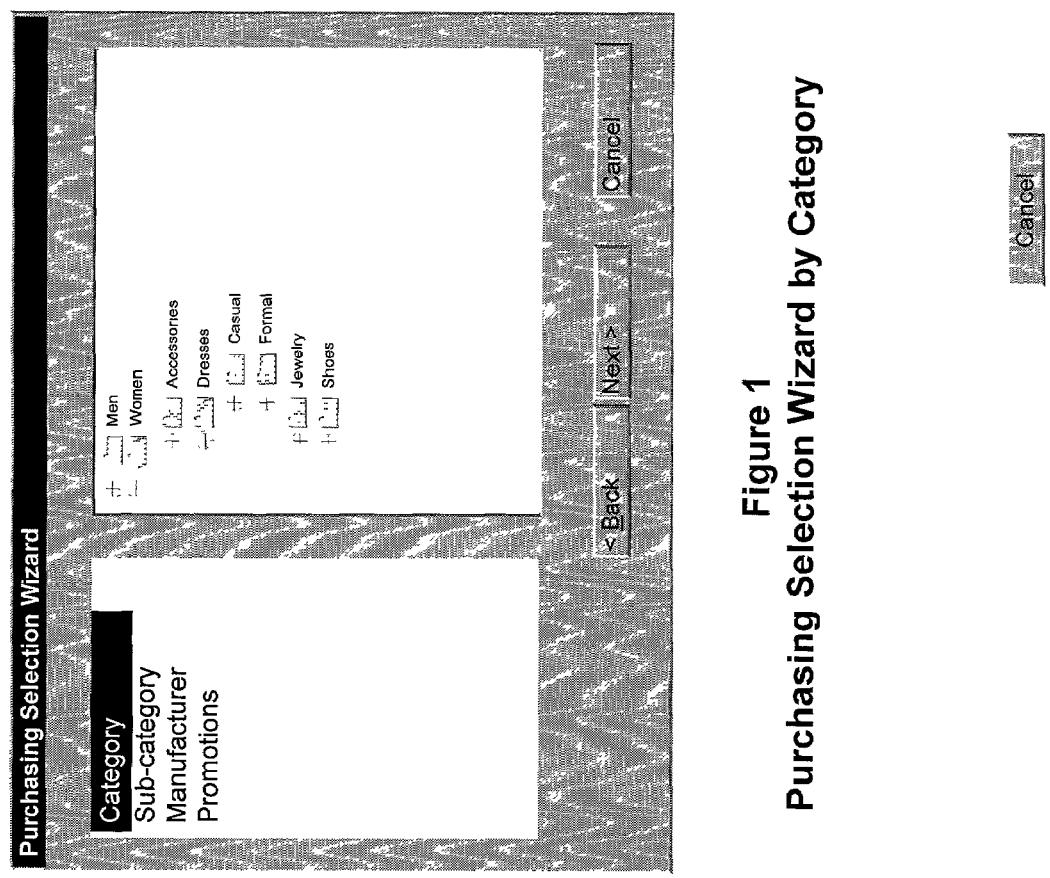
FIG. 1 is a computer screen printout depicting a screen for a purchasing selection by category.
Figure 2:
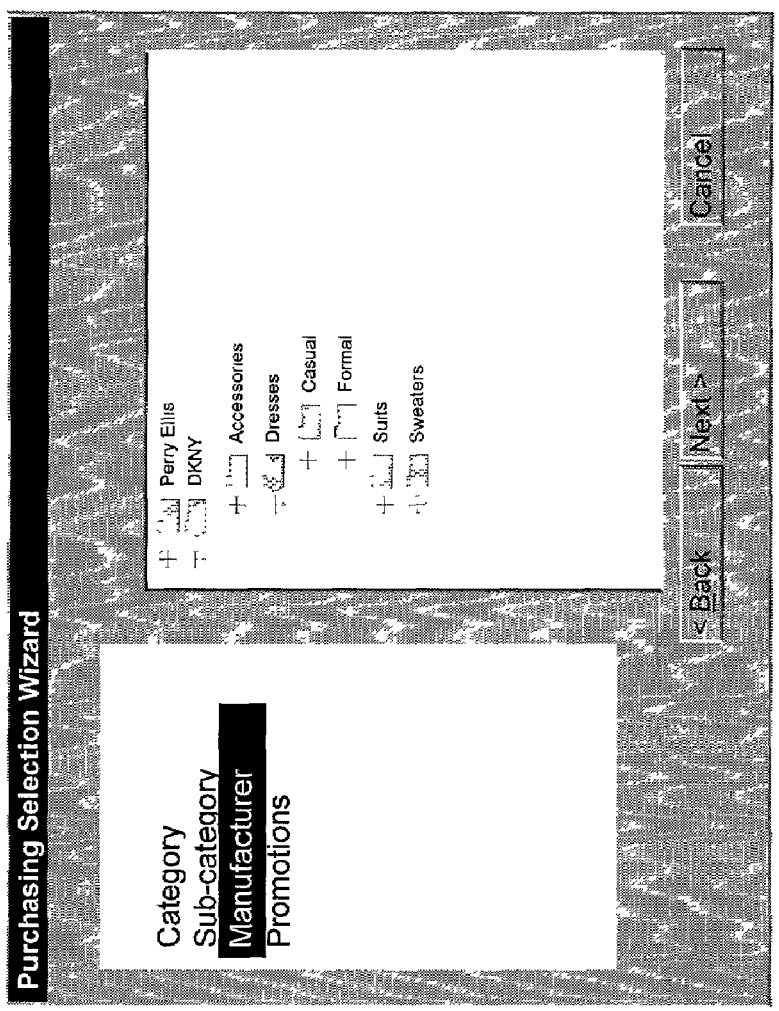
FIG. 2 is a computer screen printout showing a screen for a purchasing selection by manufacturer.

FIGS. 1 and 2 demonstrate possible organizations of information that a wizard can present the retailer to make his selections.

Figure 3:
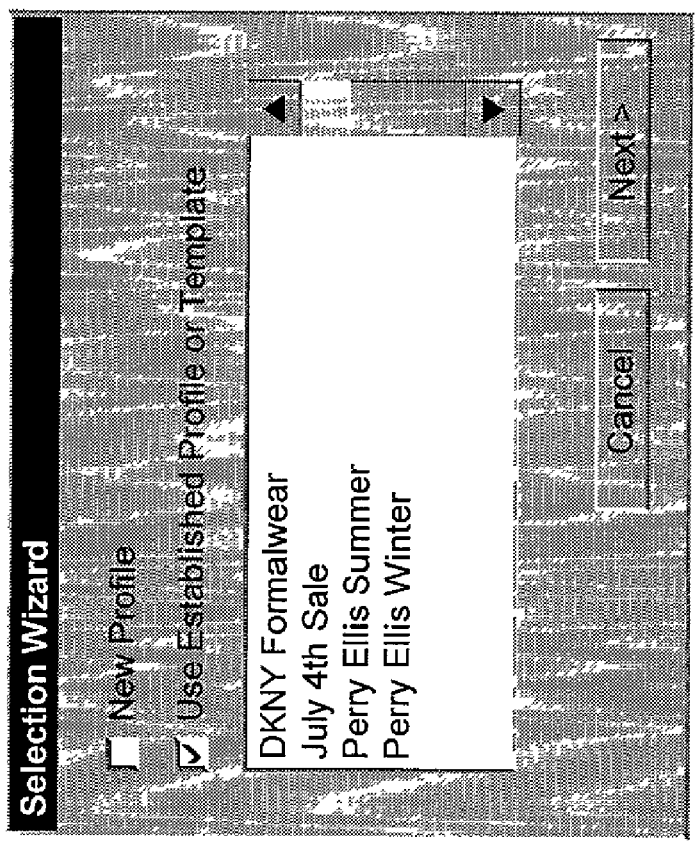
FIG. 3 is a computer screen printout showing the selection of an established profile.

The retailer may use a set of selection criteria and controls, i.e. a profile, which he has established previously or make changes to a previously saved profile and save that one as well. The retailer may also save and recall this profile at anytime in the selection process (FIG. 3).

2. Specify Desired Website Organization

This step comprises establishing the framework of a website that defines the look and feel of the site, site index and mechanisms for navigating to other pages, organization and space allocation of merchandise placement, special categories, etc.

A website may be designed to be static, i.e., the HTML code is fixed at the time of each page's creation; or, the site may be dynamic wherein the retailer's databases are queried to build pages for display when visited by shoppers. In establishing the organization and framework of the website, the retailer also enables the ability to use (as described below) one or more of the following controls and directions for the placement of merchandise:

by Category;
by Manufacturer;
by promotions, closeouts, etc.;
by color scheme, size, season of use, discount areas, etc.;

Tags representing begin and end dates for the placement of merchandise and subsequent building of the website.

For example, a clothing retailer, having decided during step 1 to carry certain designers—Perry Ellis, Ralph Lauren, and the like—might choose to display all the stocked merchandise from each of those manufacturers together on one or more web pages, while the remainder of the website might be organized in other ways, for example with all shirts, from all non-designers, displayed together.

In addition, the WC allows the user to associate beginning and ending dates with certain areas of the desired website. For example, the Spring Fashions area might be tagged with a beginning date of March $1^{st}$, and an ending date of June $30^{th}$. A section of the website which will reflect a one-week sale might be tagged to begin on July $5^{th}$ and end on July $11^{th}$. As will be seen in step 6, tagged dates will affect the process of building the website.

The retailer may also wish to prevent a manufacturer's line from overpowering his own look and feel. Such controls can include how much web page display space is to be devoted to each item, or to the goods of a particular designer, or to a particular category of merchandise, as well as the extent and nature of the descriptive information pertaining to each item, as provided by the manufacturer, which is to be incorporated in the item's description on the website.

3. Create the Website's Graphic Design

Tools such as Microsoft's FrontPage, etc. are commonly used to design the layout of a website, place graphics, establish hyperlinks, etc. according to the retailer's needs and desires. Such tools also offer the facility of establishing Style Sheets and templates for use in creating, recreating and rebuilding web pages with minimal user interaction. Other tools, such as Microsoft's Active Server Page technology and Blue World Communication's Lasso Web Data Engine, exemplify techniques for constructing dynamic websites. The WC will provide similar facilities itself, or will interact with existing tools such as Frontpage, Active Server Page or Lasso Web Data.

4. Choose Merchandise Meeting the Selection Criteria from a Plurality of Vendors The WC accesses in turn the information (which may be a website, CD-ROM, online catalog, computer-readable database, etc.) from each vendor specified in step 1. A list (the "Stocking List") is compiled of any merchandise that matches the selection criteria established in step 1. The WC user is permitted to approve or reject the matching merchandise, either individually or by group or category, before it is placed on the Stocking List.

The invention tracks selections as they are made, thus enabling the retailer to create an electronic purchase order. The retailer may place the order on-line to the vendor, defer until his selections are complete, print the order to submit it in writing, or defer any actions until a later date.

It is common that the same (or equivalent) merchandise can be purchased from multiple vendors. After the selections have been made, the retailer may decide to purchase the same item from multiple vendors due to price, availability, purchasing terms, etc. The invention's ability to access multiple vendor databases and defer submitting purchase orders makes such comparison shopping convenient.

5. Download Purchasing, Marketing and Other Information for Chosen Merchandise

As the retailer makes his selections of merchandise from a vendor, he also selects corresponding data and specifies various controls and directions that are to be applied to the data to be downloaded.

Among the controls and directions that the retailer can specify:
  Accept or reject marketing material, images, hyperlinks, etc. matching the merchandise chosen;
  Select purchase orders, pricing schedules, delivery schedules, etc. for transmittal to the retailer;
  E-mail addresses, the retailer's download sites, etc.;

These controls and directions are stored into a download list (DL) that records who, what, when, where and how each item is to be downloaded to the retailer.

For example, the vendor may be directed to send electronic purchase orders to the retailer using e-mail, whereas, the retailer may be directed to obtain marketing material and images from one or more download sites. Alternatively, the vendor may be directed to send that information to one or more destination sites using FTP transfer protocols. Using the DL as a reference and checklist, the transfers can be initiated by either or both the retailer and vendor as appropriate.

The information subsequently downloaded can be included in the website and, if so desired, into a database used by the retailer for order entry, inventory control and for the dynamic construction of web pages.

6. Build (or Rebuild) the Website

When all merchandise selections have been completed, and based upon the specified controls and directions, the WC automatically constructs a functioning retail website offering all the selected merchandise, organized as directed by the retailer, by manufacturer, by category of item, by season of use, by waist size, color scheme, etc., incorporating appropriate text, images and other information also provided by the manufacturer.

During the build process, any beginning and ending dates specified in step 2 are honored: sections of the website which would otherwise be built are not built if the current date (or the date of proposed "publication" of the website) does not fall within the specified date range.

But, once built, a typical retail website must still be changed and updated periodically. The merchandise being sold by the retailer is changing over time, as the seasons change, or as the selected vendors add or delete items from their own availability lists. Inventory that is not on display cannot be sold and inventory that is out of stock should not be sold. The retailer may also desire to advertise promotions and sales or just change the look (which is very common for seasonal changeovers).

A website may be refreshed by repeating the prior build, as in step 6. While keeping the same organization and merchandise selection, WC will automatically delete any sections of the site whose ending date has passed, while building all sections (some for the first time) whose beginning date has been reached.

Or the retailer can recreate the website starting at step 1 while changing any of the controls, specifications and directions which were made originally.

Optionally, the invention creates a traditional storefront kiosk, for shoppers to use in making their purchases.

Optionally, the invention stores the new layout in advance of changeovers or as a profile or template for future selections. The invention makes it possible to replace summer merchandise with fall merchandise in a straightforward way while honoring all the organizational decisions described above, which are persistent until explicitly changed. Thus, a web retailer could readily replace a manufacturer's summer line of clothing with the fall line by deselecting one group of items and selecting another, then causing the invention to rebuild the website, which would retain the organization and character previously established.

Optionally, the invention adds and removes merchandise from the site based upon the beginning and end dates specified. This process might occur according to a periodic schedule, such as daily, at midnight. Alternatively, it could be initiated automatically, when WC detects one of the following conditions:
  a beginning or ending date has passed, thus requiring that a section of the site be deleted, rebuilt or generated
  a vendor has changed the characteristics (availability, price, colors) of a stocked item (which is detected by periodically reexamining the vendor's website or online database)

Optionally, the invention permits the retailer to take a current, past or tentative configuration and make changes to the inventory selection, controls and directions. Those changes are then reflected in the current or future website.

Optionally, the retailer may select a category, vendor, etc. and dynamically build a website for on-line use, a storefront kiosk, for electronic and print advertising, etc.

Among the many benefits that are apparent, namely, eliminating duplicative tasks, tedium, errors, etc., the on-line retailer should benefit by
  Reduced administrative costs;
  Up to date inventory and website; and
  Ease of changeovers due to seasonal and other factors.

While the invention has been described only in terms of the generation of retail websites, it also has broader applicability. Clearly, the invention could generate websites for distributors, displaying the wares of the manufacturers that they represent. Or, "mini-museum" websites could be generated, each displaying some selection of art objects (paintings, sculpture, tapestries) whose images and descriptions are selected and obtained, under the auspices of the invention, from one or more master museums that might make such material available, such as MOMA or the Whitney. Or, text-oriented websites displaying, for example, news on particular topics might be generated, with the material selected and obtained from the more general run of new items available from Reuters, the AP or Ziff-Davis.

Figure 4:
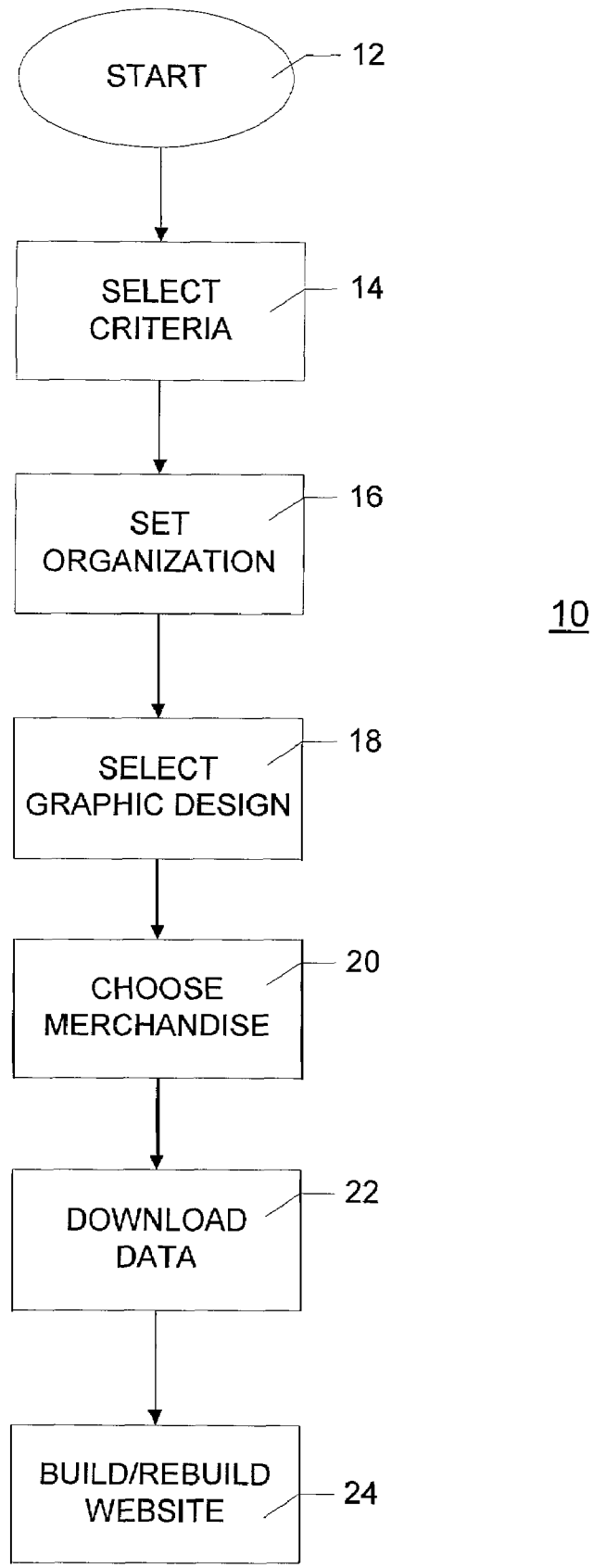
FIG. 4 is a flowchart depicting process steps and system constituents of the present invention.

With reference to FIG. 4, the system or process of the present invention follows certain main steps and involves several subsystems, as noted below.

The process begins with a start block 12, where all initialization steps and preparatory functions are attended to. Thereafter, the operator sets the criteria for merchandise to be stocked at step 14. The overall organization of the website, as previously described, is attended to at step 16.

The operator has some control over the look and feel of the website by selecting its graphic design and layout, as indicated at step 18. Step 20 involves the selection and specification of actual merchandise and that step is then followed with the actual, automated or substantially automated, downloading of the actual merchandise information at step 22. The final step 24, which is again a substantially automated step, involves the actual building of the website by incorporating the merchandise information and installing it into the proper locations on the website.

As described above, the invention enables the creation of retailer websites and the like in a substantially automated fashion or at least in a semi-automated fashion. The system streamlines and greatly facilitates the creation of such websites. The invention can also include the expedient of providing its own database of SKU numbers, optionally by categories of products, vendors, price ranges, etc., which can be looked up or perused locally, and then used to contact vendors or suppliers, e.g., via the Internet, to complete the actual website construction.

The present invention also teaches the creation of standard-format information banks by vendors, suppliers and the like. These information banks can then be accessed by the website constructor of the present invention, which will be able to readily recognize the relevant information in these databases websites, both as to information content, as well as information type.

For example, a hypothetical vendor data format may designate a first data field to contain the SKU numbers, another data field the description of the item and a third data field, the availability information, etc.

A still further extension of the present invention allows interactive communication between the databases of the vendors/suppliers, on the one hand, and the website constructor of the present invention, on the other hand, in a manner that enables vendors to initiate communications with website constructors at retailers and query them concerning orders that they have taken for merchandise, as well as about their inventory and the like. Vendors can then bid to supply the retailers, promoting competition and better prices and service.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A website constructor program operable to execute on a processor comprising at least one computer program operable for running on at least one computer, the website constructor comprising:
   a selection criteria module that establishes a selection criteria for merchandise selection;
   a website organization module that defines a look and feel of a website constructed by the website constructor;
   a graphic design module that creates at least one website layout and features setup for the website constructed by the website constructor;
   a merchandise selection module in the website constructor that selects merchandise offered for sale on the website constructed by the website constructor that matches the selection criteria at least substantially automatically, the merchandise selection module being based on merchandise made available by a plurality of vendors;
   a merchandise information downloading module that downloads substantially automatically, from a plurality of vendors of merchandise, merchandise information defining the merchandise offered for sale on the website constructed by the website constructor that has been selected by the merchandise selection module; and
   a website builder that builds the website based on the criteria and conditions that have been setup by the foregoing modules.

2. The website constructor of claim 1, wherein the constructor is operable substantially automatically.

3. The website constructor of claim 1, in which the website is optimized for a retail operation.

4. The website constructor of claim 1, in which merchandise information comprises at least two of the following merchandise parameters that are selected from the group consisting of product code, UPC code, SKU code, product description, retail price, product style, product color, product size, product ordering information, product incentive program, product image, and product tags.

5. The website constructor of claim 4, in which the merchandise information is provided in Extensible Markup Languages (XML).

6. The website constructor of claim 1, in which the selection criteria comprises at least two parameters selected from the parameter group consisting of category; subcategory; manufacturer; vendor; promotions; close-out; starting date and ending date of seasonal merchandise.

7. The website constructor of claim 1, in which the website organization module defines the look and feel of the website by reference to one or more organization parameters selected from the parameter group consisting of category; manufacturer; promotions; close-out; product appearance; and tags representing the begin and end dates for the placement of merchandise on the website.

8. The website constructor of claim 1, in which the merchandise selection module enables a user of the website constructor to control downloading of merchandise information in a manner which enables: acceptance or rejection of marketing or merchandise information based on the selection criteria; selection of purchase orders, pricing schedules, and delivery schedules; and specification of loading information.

9. The website constructor of claim 1, in which the website builder enables periodical rebuilding of the website.

10. The website constructor of claim 1, in which the website builder enables rebuilding of the website based on the detection of a changed condition.

11. The website constructor of claim 10, in which the changed condition comprises a change in a date.

12. The website constructor of claim 10, in which the changed condition comprises the changing of the merchandise information by a vendor.

13. The website constructor of claim 10, in which the changed condition constitutes a manual intervention by a user of the website constructor.

* * * * *